(12) United States Patent
Bertini et al.

(10) Patent No.: US 8,572,842 B2
(45) Date of Patent: Nov. 5, 2013

(54) METHOD FOR THERMALLY ENHANCING INJECTION OF POWER CABLES

(75) Inventors: Glen J. Bertini, Tacoma, WA (US); Norman E. Keitges, Renton, WA (US)

(73) Assignee: Novinium, Inc., Auburn, WA (US)

( * ) Notice: Subject to any disclaimer, the term of this patent is extended or adjusted under 35 U.S.C. 154(b) by 1070 days.

(21) Appl. No.: 12/572,092

(22) Filed: Oct. 1, 2009

(65) Prior Publication Data

US 2010/0122453 A1 May 20, 2010

Related U.S. Application Data

(60) Provisional application No. 61/114,733, filed on Nov. 14, 2008.

(51) Int. Cl.
*H01R 43/00* (2006.01)

(52) U.S. Cl.
USPC .............................. 29/858; 29/855; 427/117

(58) Field of Classification Search
USPC ............. 29/33 F, 825, 854–859; 34/104, 107; 252/389.31; 174/23 C, 25 C, 25 P; 427/117, 118, 120, 140
See application file for complete search history.

(56) References Cited

U.S. PATENT DOCUMENTS

| | | | |
|---|---|---|---|
| 4,372,988 A | 2/1983 | Bahder | |
| 4,545,133 A | 10/1985 | Fryszczyn et al. | |
| 4,766,011 A | 8/1988 | Vincent et al. | |
| 4,888,886 A * | 12/1989 | Eager et al. | ...................... 34/104 |
| 5,372,841 A | 12/1994 | Kleyer et al. | |
| 6,162,491 A | 12/2000 | Bertini | |
| 7,195,504 B2 | 3/2007 | Bertini et al. | |
| 7,538,274 B2 | 5/2009 | Bertini et al. | |
| 7,611,748 B2 | 11/2009 | Bertini | |
| 7,615,247 B2 | 11/2009 | Bertini et al. | |
| 2007/0046668 A1 | 3/2007 | Bertini | |
| 2007/0240893 A1 | 10/2007 | Bremnes et al. | |
| 2008/0169450 A1 * | 7/2008 | Chatterton et al. | ...... 252/389.31 |
| 2008/0173467 A1 | 7/2008 | Bertini et al. | |
| 2008/0223498 A1 | 9/2008 | Bertini et al. | |

OTHER PUBLICATIONS

Premedia Business Magazines & Media Inc.; Transmission & Distribution World: Submarine Cable Rescued With Silicone-Based Fluid; Jul. 1, 1999; 4 pgs.; USA.
Glen J. Bertini, Entergy Metro Case Study; Post-Treatment Lessons; ICC Meeting; Apr. 1997; Scottsdale, Arizona; USA.
Jenkins, Kim, UTILX Corporation.; Submarine Cable Rescued With Silicone-Based Fluid; Slide Presentation; USA; May 16, 2000.
NOVINIUM: Case Study; Circuit Owner: Littleton Electric Light Department (Littleton, Mass. USA), Cable: 25 kV, XLPE # 2 cable (42.4 mm2); 2009; 2 pages.
Bertini, Glen, "Injection Supersaturation"; IEEE Power Engineering Society, Insulated Conductors Committee: Fall 1998, St. Petersburg, Florida; Oct. 25-28, 1998; 6 pgs.
Glen J. Bertini and Norman E. Keitges ; "Silicone Injection: Better With Pressure" on May 19, 2009. 7 pgs.
Glen J. Bertini and Norman E. Keitges ; "Silicone Injection: Better With Pressure" Power Point Presentation to Subcommittee A, ICC; on May 19, 2009, 5 slides.

* cited by examiner

*Primary Examiner* — Donghai D Nguyen
(74) *Attorney, Agent, or Firm* — Davis Wright Tremaine LLP; George C. Rondeau, Jr.

(57) ABSTRACT

A method for enhancing the dielectric properties of at least one in-service electrical cable section having a central stranded conductor encased in a polymeric insulation jacket and having an interstitial void volume in the region of the conductor. The method includes filling the interstitial void volume with at least one dielectric property-enhancing fluid and then confining the fluid within the interstitial void volume at a residual pressure greater than about 50 psig, with the pressure being imposed along the entire length of the cable section and being below the elastic limit of the insulation jacket. The cable section is heated by imposing a potential of no more than about 500 volts across the conductor during at least a portion of the time required to complete the other described steps.

26 Claims, No Drawings

METHOD FOR THERMALLY ENHANCING INJECTION OF POWER CABLES

CROSS REFERENCE TO RELATED APPLICATIONS

This application claims priority to U.S. Provisional Patent Application No. 61/114,733 filed Nov. 14, 2008.

FIELD OF THE INVENTION

The present invention relates to a method for extending the longevity of an electrical power cable. More particularly, the invention relates to an accelerated method for restoring the dielectric properties of an in-service electrical cable section wherein a dielectric enhancing fluid is injected into the interstitial void volume of the cable.

BACKGROUND OF THE INVENTION

Extensive networks of underground electrical cables are in place in many parts of the industrialized world. Such underground distribution offers great advantage over conventional overhead lines in that it is not subject to wind, ice or lightning damage and is thus viewed as a reliable means for delivering electrical power without obstructing the surrounding landscape, the latter feature being particularly appreciated in suburban and urban settings. Unfortunately, these cables (which generally comprise a stranded conductor surrounded by a semi-conducting conductor shield, a polymeric insulation jacket, and an insulation shield), particularly those installed prior to 1985, often suffer premature breakdown and do not attain their originally anticipated longevity of 30 to 40 years. Their dielectric breakdown is generally attributed to so-called "treeing" phenomena (i.e., formation of microscopic voids or branching channels within the insulation material, from which the descriptive terminology derives), which lead to a progressive degradation of the cable's insulation. Since replacing a failed section of underground cable can be a very expensive and involved procedure, there is a strong motivation on the part of the electrical utility industry to extend the useful life of existing underground cables in a cost-effective manner.

An early method for rejuvenating in-service cables is disclosed in U.S. Pat. No. 4,372,988, wherein a tree retardant fluid is introduced into the interstitial void volume associated with the strand conductor geometry. This fluid diffuses into the insulation and fills the microscopic trees to augment the service life of the cable. Later, improved fluids selected from a particular class of aromatic alkoxysilanes, which can polymerize within the cable's interstitial void volume as well as within the water tree voids in the insulation, were taught in U.S. Pat. No. 4,766,011 and this method, as well as variations thereof employing certain rapidly diffusing components (U.S. Pat. Nos. 5,372,840 and 5,372,841), have enjoyed commercial success for more than a decade.

Unfortunately, some practical limitations remained when these methods were used in reclaiming underground residential distribution (URD) cables. The latter have a relatively small diameter (typically smaller than 4/0 and a conductor area of <107.2 $mm^2$) and therefore present insufficient interstitial volume relative to the amount of retardant fluid required for optimum dielectric performance (e.g., sufficient retardant to saturate the conductor shield and insulation of the cable section). And, since all of the above-recited methods teach the injection of tree retardant fluid at a relatively low pressure, typically less than about 30 psig, insufficient fluid to provide the desired dielectric improvement is often supplied when the interstitial void volume is filled. Therefore, although not explicitly required by the above mentioned disclosures, an in-the-field reclamation of URD cables employing the silane-based tree retardants typically leaves a fluid reservoir connected to the cable for a 60 to 90 day "soak period" to allow additional introduction of tree retardant fluid which can penetrate (i.e., diffuse into) the cable insulation and thereby restore the dielectric properties of the insulation.

An improved cable rejuvenation method, wherein the dielectric enhancement fluid is injected at elevated (high) pressures and confined in the interstitial void volume of the cable section at a similar elevated residual pressure, was described in detail in United States Patent Application Publication No. 2005/0189130. Unlike the above mentioned procedures, this high-pressure method facilitated reclamation of cables having insufficient interstitial volume without the need to employ the lengthy, and often hazardous, soak period.

SUMMARY OF THE INVENTION

It has now been discovered that an improved efficiency can be enjoyed in treating the above-described stranded-conductor cables having inadequate interstitial volume relative to the amount of dielectric enhancement fluid required, particularly URD cables. The instant method is particularly suited for rejuvenating an in-service cable section having a constrained conductor geometry, which method comprises filling the interstitial void volume of the cable section with at least one dielectric property-enhancing fluid and then confining the fluid within the interstitial void volume at a residual pressure greater than about 50 psig, the pressure being imposed along the entire length of the cable section and being below the elastic limit of the insulation jacket, wherein the cable section is heated by imposing a potential of no more than about 500 volts across the conductor during at least a portion of the time required to complete the above steps.

DETAILED DESCRIPTION OF THE INVENTION

It has now been found that even the above-mentioned high-pressure rejuvenation method is inadequate when certain conditions are encountered in the field. Thus, for example, cables having compacted and/or compressed conductor strands, or those having some other obstruction are sometimes very difficult or impossible to inject or may require an unacceptably lengthy injection duration. Additionally, the actual amount of fluid which is delivered to a population of similar cable sizes at a given pressure has been observed to vary significantly from the mean value. Aside from the obvious possible human errors and/or equipment variations during a typical high-pressure injection, unavoidable deviations from the mean of the amount of fluid injected can be expected in view of cable manufacturing variations, aging variations (e.g., corrosion) and local soil temperature variations at burial depth. Additionally, when previously injected cables are being re-injected, variations may exist in the amount of fluid remaining in the strands. Difficulties encountered while injecting a cable having the above-described constrained geometry can be further exacerbated when the dielectric enhancement fluid has a relatively high viscosity, due either to the particular fluid formulation being employed or to ambient temperature, when there is liquid water in the strands of the cable, and when the cable section is so long that oligomerization of monomeric silanes typically employed for the application can undergo premature hydrolysis and condensation, and thereby suffer an increase in viscosity as the injection proceeds.

The instant method addresses the above-mentioned drawbacks of the prior art processes and teaches the rejuvenation of cables previously considered impossible or impractical to treat. Moreover, the instant method can significantly expedite the rejuvenation process when the above-mentioned obstructions are minimal or entirely absent. Furthermore, consistency of treatment can be improved by using the instant method wherein the above mentioned variation in the amount of injected fluid is minimized and therefore greater, and more consistent, dielectric reliability is attained. Other potential benefits provided by the instant method include:

1. Some blockages may be cleared at the higher temperatures.
2. Fluid comprising dissolved solids is much less likely to crystallize within the cable during the injection.
3. More rapid increase in post-injection dielectric performance of the cable section is realized since permeation of fluid into the insulation jacket receives an initial thermal boost.

The types of cables most likely to benefit from the instant method have relatively small conductors, such as Nos. 1, 2 or 4 AWG, particularly cables having designations of 4/0 or smaller and even more particularly those that have compressed or compacted strands. Further, a cable may be a good candidate for the instant method when the conductor has 19 or more strands and is either compacted or compressed. The degree of compaction or compression can be estimated by measuring the strand conductor outer diameter at an exposed cable end and comparing this to the published value for the particular cable size. Additionally, a flow test could be employed, as well known in the art. Yet another indication for using the instant restoration method is based on experience with similar cables at the site which suggests that the "target" fluid amount (i.e., amount of fluid to achieve optimal dielectric enhancement) cannot be injected within a reasonable saturation period, as described infra. Finally, the instant method is advantageously employed when the actual fluid supplied during an attempted high-pressure injection is below a "floor" value (i.e., the minimum amount of fluid required to provide the designed, but less than optimal, life extension). For further guidance on estimating target and floor fluid amounts and selection of particular fluid formulations, the skilled artisan is directed to the disclosures of above-cited United States Patent Application Publication No. 2005/0189130, as well as United States Patent Application Publication Nos. 2007/0046668 and 2005/0192708.

In general, the instant method introduces a modification to the above-mentioned high-pressure method of United States Patent Application Publication No. 2005/0189130, hereby incorporated by reference, wherein the cable's conductor is electrically heated during at least a portion on the injection process. Thus, briefly stated, the instant method for enhancing the dielectric properties of at least one in-service electrical cable section having a central stranded conductor encased in a polymeric insulation jacket and having an interstitial void volume in the region of the conductor comprises filling the interstitial void volume with at least one dielectric property-enhancing fluid and then confining the fluid within the interstitial void volume at a residual pressure greater than about 50 psig, the pressure being imposed along the entire length of the section and being below the elastic limit of the insulation jacket, wherein the cable section is heated by imposing an approximate potential of no more than about 500 volts across the conductor ends during at least a portion of the time required to complete the above steps.

For the purposes herein, the in-service electrical cable according to the present method is generally of the type used in underground residential distribution and typically comprises a central core of a stranded copper or aluminum conductor encased in a polymeric insulation jacket. As is well known in the art, there is usually also a semi-conducting or high permittivity polymeric conductor shield positioned between the conductor and the insulation jacket. Further, there is often a semi-conducting insulation shield covering the insulation, the latter being ordinarily wrapped with a wire or metal foil grounding strip and, optionally, encased in an outer polymeric protective jacket. The above-mentioned interstitial volume is the void space within the conductor shield, and is defined by the strand geometry. The insulation is preferably a polyolefin polymer, such as polyethylene or a copolymer of ethylene and propylene or vinyl acetate or is a solid-fluid dielectric such as paper-oil. Medium voltage (5-35 kV), low voltage (<5 kV) and high voltage (>35 kV) cables are contemplated herein.

As used herein, the term "in-service" refers to a cable which has been under electrical load and exposed to the elements, usually for an extended period (e.g., 10 to 40 years). In such a cable, the electrical integrity of the cable insulation has generally deteriorated to some extent due to the formation of water or electrical trees, as described above. Further, the term "cable segment" as used herein refers to the length of cable between two terminal connectors, while a "cable sub-segment" is defined as a physical length of uninterrupted (i.e., uncut) cable extending between the two ends thereof. Thus, a sub-segment can exist between a terminal connector and a splice connector or between two splice connectors, and a cable segment can comprise one or more sub-segments. It should also be apparent that a cable segment is identical with a sub-segment when no splices are present between two terminal connectors. For the sake of efficiency, the term "cable section" will be used herein to designate either a cable segment or a cable sub-segment, and the more specific terms will be applied where appropriate.

As used herein, "high pressure" is defined as a pressure above about 50 psig, but less than that corresponding to the elastic limit of the cable's insulation. In order to facilitate rapid injection, the pressure is as high as possible consistent with the elastic limit constraint. For example, the pressure can be between about 100 and about 1000 psig, between about 100 and about 600 psig, between about 300 psig and about 1000 psig, or between about 200 psig and about 400 psig. As used herein, the term "elastic limit" of the insulation jacket of a cable section is defined as the internal pressure in the interstitial void volume at which the outside diameter of the insulation jacket takes on a permanent set at 25° C. greater than 2% (i.e., the OD increases by a factor of 1.02 times its original value), excluding any expansion (swell) due to fluid dissolved in the cable components. This limit can, for example, be experimentally determined by pressurizing a sample of the cable section with a fluid having a solubility of less than 0.1% by weight in the conductor shield and in the insulation jacket (e.g., water), for a period of about 24 hours, after first removing any covering such as insulation shield and wire wrap. Twenty four hours after the pressure is released, the final OD is compared with the initial OD in making the above determination. Further, this terminology is also applied to the "high-pressure connectors" which are specifically designed to inject the fluid and confine it at the above-defined high pressure. These high-pressure connectors are described in detail in United States Patent Application Publication No.

2007/0169954, now U.S. Pat. No. 7,538,274, as well as U.S. Pat. No. 7,195,504, both of which are hereby incorporated by reference. For the purposes herein, a cable splice comprising two preferred swagable high-pressure terminal connectors is shown in FIG. 14 of Publication No. 2007/0169954.

According to the instant method, a flow of electrical current through the conductor is used to heat the cable section during at least a portion of the time required to inject the dielectric enhancing fluid into the cable section and confine it therein at an elevated pressure. The cable is heated by imposing a potential of about 500 volts, or less, across the ends of the conductor, the resistive loss being proportional to $I^2R$, where I is the current (RMS for AC) in amperes and R is the conductor resistance (resistive component of impedance for AC). This low voltage source can be an external AC or, preferably, a DC power supply, such as units commonly employed in welding operations. It should be clear to those skilled in the art that the above mentioned potential, which is preferably in the range of about 5 to about 50 volts, is much lower than that typically found in energized power cables (e.g., 5-35 kV). This low voltage is adjusted to provide the appropriate current flow to heat the conductor to a temperature of at least about 10° C., preferably at least about 20° C., above ambient temperatures, which in the case of underground cables, is the ground temperature at the burial depth of the cable. Thus, for example, this temperature rise can be about 10 to 40° C. above ambient. The aforementioned temperature rise can be estimated from the measured current flow and the known resistance of the conductor length being heated. More typically, however, this temperature is measured at the thermally insulated surface of the cable dielectric insulation or insulation shield about a foot away from the injection end of the cable. The thermal insulation prevents the escape of the majority of the heat flux from the cable conductor and hence provides a time-delayed, but good approximation of the maximum conductor temperature. Since the majority of the cable is buried in soil, which provides a relatively good conductive heat transfer and a large heat sink, and the exposed cable ends enjoy better heat transfer from convection and radiation, the point where the thermal insulation is applied generally represents the maximum conductor temperature. More preferably, the conductor temperature is increased to a level of about 25 to 50° C. above ambient. It should, however, be appreciated that the temperature of the insulation jacket is to be kept below the thermal rating of the cable, which in the case of the most commonly encountered cross-linked polyethylene insulation, is less than about 90° C. The temperature at the connector (conductor), as well as that at the surface of the insulation jacket, can be measured using a non-contacting laser thermometer (e.g., Cen-Tech™).

In a typical procedure, the cable section to be rejuvenated is prepared according to steps known in the art. The conductor is accessed at the first end (generally the injection end) of the cable section being treated and it is electrically connected to the (preferably) positive terminal of a DC power supply. The conductor at the second (opposite) end of the cable section is also exposed and is grounded. Preferably the conductor is also connected to the cable's neutral wire with a redundant jumper cable. Of course, the jumper should have sufficient capacity to accommodate the intended heating current. The presence of the redundant jumper removes any doubt about the quality of ground connections that may have been in place for decades. The cable's neutral wire at the first end, which is also at ground potential, is connected to the negative terminal of the power supply. If the neutral is not of sufficient ampacity to carry the return current, either by design or as a result of corrosion, an alternate cable can be utilized in its place. The alternate cable may be a parallel cable which is already in place, or a temporary jumper cable can be laid upon the ground or otherwise strung to provide a return current path.

Although the present method contemplates that the cable section is heated during at least some portion of the injection and confinement steps, it is preferred that the heating is applied both during the initial filling phase and the saturation phase. During the filling phase the fluid applied at the injection end flows down the length of the cable section and is typically bled off for a short time (e.g., a few minutes) at the opposite far end to ensure that the interstitial void volume is completely filled. During the subsequent saturation phase, the far end of the cable section is sealed and the fluid continues to flow into the cable end from the injection end. After a desired amount of fluid has been introduced into the interstitial void volume at elevated pressure, it is confined therein at a residual pressure of greater than about 50 psig by sealing the injection end of the section, as fully detailed in above-cited United States Patent Application Publication No. 2005/0189130. As in the case of the method described in this publication, it is also contemplated herein that the dielectric property-enhancing fluid may be supplied at a pressure greater than about 50 psig for more than about 2 hours before being confined within the interstitial void volume. In a variation on this embodiment, fluid can be injected from both ends of the cable section simultaneously and bled through an intervening splice equipped with a pair of injection adaptors, the latter being sealed when sufficient fluid has been introduced. Less preferably, heating can be applied only during at least a portion of the saturation phase. Even less preferably, heating can be applied only during at least a portion of the filling phase, although residual heat transfer from the conductor implies that some degree of heating is likely to persist into the saturation phase as the temperature of the conductor decays.

It is further contemplated herein that the instant method may be combined with the integrated method for restoring electrical power cables disclosed in U.S. Pat. No. 7,353,601, hereby incorporated by reference. In this case, after all conventional splices and terminations are replaced with corresponding high-pressure connectors, the cable section is heated during at least a portion of the time required to inject the dielectric enhancement fluid into the cable section and confine it therein, during a single switching cycle.

In accordance with one aspect, the instant method enhances the dielectric properties of at least one in-service electrical cable section having a central stranded conductor encased in a polymeric insulation jacket and having an interstitial void volume in the region of the conductor. The method includes de-energizing the cable, filling the interstitial void volume of the de-energized cable with at least one dielectric property-enhancing fluid, and imposing a potential of no more than about 500 volts across the conductor to heat the fluid in the interstitial void volume prior to re-energizing the cable. In accordance with another aspect, when used with an insulation jacket having an elastic limit, the method further includes confining the fluid within the interstitial void volume at a residual pressure along the entire length of the cable section with the residual pressure being below the elastic limit of the insulation jacket after filling the interstitial void volume. Preferably, the fluid is confined within the interstitial void volume at a residual pressure greater than about 50 psig along the entire length of the cable section. The potential may be imposed to heat the fluid in the interstitial void volume during at least a portion of the time the fluid is confined within the interstitial void volume, and/or may be imposed to heat the fluid in the interstitial void volume during at least a portion of the time required to fill the interstitial void volume with the fluid.

The dielectric enhancement fluid to be used in the present method (also referred to as a tree retardant agent or anti-treeing agent herein) may be selected from at least one of the compounds known to prevent water trees in polymeric insulation when compounded into the insulation and/or injected into a new cable or an in-service cable. Such compounds as sulfur hexafluoride, aromatic ketones (e.g., acetophenone), alcohols (e.g., dodecanol, isolauryl alcohol, and 2-ethyl-hexanol), UV stabilizers (e.g. 2-hydroxy-4-n-octyloxy-benzylphenone, Tinuvin® 123, and Tinuvin® 1130), and organoalkoxysilanes which preferably contain aromatic unsaturation illustrate the range of suitable anti-treeing agents which can be employed as the dielectric enhancing (restorative) fluid in the present method. Many such systems have been described in the patent literature and the interested reader is referred to U.S. Pat. No. 4,144,202 to Ashcraft et al., U.S. Pat. No. 4,212,756 to Ashcraft et al., U.S. Pat. No. 4,299,713 to Maringer et al., U.S. Pat. No. 4,332,957 to Braus et al., U.S. Pat. No. 4,400,429 to Barlow et al., U.S. Pat. No. 4,608,306 to Vincent, U.S. Pat. No. 4,840,983 to Vincent, U.S. Pat. No. 4,766,011 to Vincent et al, U.S. Pat. No. 4,870,121 to Bamji et al., U.S. Pat. No. 6,697,712 to Bertini et al., U.S. Pat. No. 5,372,841 to Kleyer et al., and the above cited United States Patent Application Publication No. 2005/0189130 A1, among others.

Thus, for example, the fluid can be a mixture comprising (a) at least one anti-treeing agent; and (b) a water-reactive compound having a diffusion coefficient of greater than $10^{-7}$ cm$^2$/second at 50° C. in the polymeric insulation jacket, the mixture having an initial viscosity of ≤100 cP at 25° C., wherein components (a) and (b) are different, as taught in U.S. Pat. No. 5,372,841. Preferably, component (a) of this fluid is at least one aryl-functional alkoxysilane and component (b) is at least one water-reactive compound selected from the group consisting of trimethylmethoxysilane and dimethyldimethoxysilane. More preferably, the above aryl-functional alkoxysilane is selected from phenylmethyldimethoxysilane, phenyltrimethoxysilane, diphenyldimethoxysilane, or phenylmethyldiethoxysilane.

Further, the dielectric enhancement fluid, or at least one component thereof, can have a diffusion coefficient between about $10^{-8}$ and about $10^{-7}$ cm$^2$/second at 50° C. in the polymeric insulation of the cable.

Highly preferred fluids of the instant method are mixtures of aromatic alkoxysilanes and dodecanol containing a condensation catalyst, as exemplified by a catalyzed mixture of 25 parts by weight of dodecanol with 75 parts by weight of p-tolylethylmethyldimethoxysilane (or a mixture of tolylethylmethyldimethoxysilane with dimethoxymethyl [2-(methylphenyl)ethyl]silane). Another preferred fluid consists of 5 wt % isolauryl alcohol, 92.5 wt % phenylmethyldimethoxysilane and 2.5 wt % Tinuvin® 123. The catalysts contemplated herein are any of those known to promote the hydrolysis and condensation of organoalkoxysilanes, provided they do not adversely affect the cable components (e.g., they do not corrode copper or aluminum conductors). Typically, these are selected from organometallic compounds of tin, manganese, iron, cobalt, nickel, lead, titanium or zirconium. Examples of such catalysts include alkyl titanates, acyl titanates and the corresponding zirconates. Specific non-limiting examples of suitable catalysts include tetra-t-butyl titanate (TBT), dibutyltindiacetate (DBTDA), dibutyltindilaurate (DBTDL), dibutyltindioleate, tetraethylorthotitanate, tetraisopropyl titanate (TIPT), tetraoctadecylorthotitanate, dibutyltindioctoate, stannous octoate, dimethyltinneodeconoate, di-N-octyltin-S,S-isooctylmercaptoacetate, dibutyltin-S,S-dimethylmercaptoacetate, or diethyltin-S,S-dibutylmercaptoacetate. In general, the catalyst is added at a level of about 0.05 to about 5% based on the total weight of the organoalkoxysilane components. More typically, it is supplied at a level of about 0.1 to about 2% or at a level of about 0.2 to 1% by weight according to the above mentioned basis. The catalyst content should be kept as low as possible since it can contribute to corrosion of the cable conductor, and this factor should be considered in the balance.

Alternatively, the catalyst can be an acid having a pKa less than about 2.1 and is added in an effective amount for promoting the hydrolysis reaction of the organoalkoxysilane with water and subsequent condensation of the resulting product of hydrolysis, as described in United States Patent Application Publication No. 2008/0173467. For the purposes herein, pKa has its usual definition of the negative logarithm (base 10) of the equilibrium constant (Ka) for the dissociation of the acid. Preferably, the acid to be used in the instant method has a pKa value between about minus 14 and about 0. The acid content should be kept as low as possible since it can contribute to the corrosion of the cable conductor, and this factor should be considered in the balance. Although it is recognized that the catalyst and the organoalkoxysilane interact on a molar basis, the catalyst should generally be added at a level of about 0.02 to about 1% based on the weight of the organoalkoxysilane component. More typically, it should be supplied at a level of from about 0.05 wt. % to about 0.6 wt. %, preferably from about 0.06 wt. % to about 0.5 wt. %. Preferably, the acid catalyst is selected from strong acids such as methanesulfonic acid, dodecylbenzenesulfonic acid, trifluoromethanesulfonic acid, benzenesulfonic acid, sulfuric acid, nitric acid, trifluoracetic acid, dichloroacetic acid and phosphoric acid.

It is also contemplated herein that a combination of an organometallic catalyst and an acid catalyst can be employed in the dielectric enhancement fluid.

As noted above, it is recognized that a composition containing organometallic catalyst and/or strong acid catalysts, such as methanesulfonic acid, tends to corrode the typical aluminum conductor of the cable and the formulation should, therefore, also incorporate a corrosion inhibitor. Compounds which act as suitable corrosion inhibitors in such an environment may be exemplified by acetophenone, acetone, Uvinul® 4050H product of BASF (CAS# 124172-53-8), and Tinuvin® 123 product from Ciba® (CAS#: 129757-67-1). Specific catalyzed formulations are illustrated in Table 1.

TABLE 1

| Component | Formulation No./Component weight % | | | | | |
|---|---|---|---|---|---|---|
| | 1 | 2 | 3 | 4 | 5 | 6 |
| Tolylethylmethyldimethoxysilane | 62.0000% | 60.0000% | 52.0000% | 43.0000% | 35.0000% | 26.0000% |
| 2-cyanobutylmethyldimethoxy-silane | 13.0000% | 17.1000% | 26.7000% | 37.3000% | 47.4000% | 57.5000% |

TABLE 1-continued

| Component | Formulation No./Component weight % | | | | | |
|---|---|---|---|---|---|---|
| | 1 | 2 | 3 | 4 | 5 | 6 |
| ferrocene | 0.5000% | 1.0000% | 1.5000% | 2.0000% | 2.5000% | 3.0000% |
| isolauryl alcohol | 18.4070% | 14.8100% | 11.7220% | 8.6355% | 5.0475% | 2.4610% |
| Tinuvin ® 123 | 2.0000% | 2.2000% | 2.4000% | 2.6000% | 2.8000% | 3.0000% |
| Tinuvin ® 1130 | 1.0000% | 1.2000% | 1.4000% | 1.6000% | 1.8000% | 2.0000% |
| geranylacetone | 1.0000% | 1.2000% | 1.4000% | 1.6000% | 1.8000% | 2.0000% |
| Irgastab ® Cable KV10 | 2.0000% | 2.4000% | 2.8000% | 3.2000% | 3.6000% | 4.0000% |
| dodecylbenzenesulfonic acid | 0.0930% | 0.0900% | 0.0780% | 0.0645% | 0.0525% | 0.0390% |
| total | 100.0000% | 100.0000% | 100.0000% | 100.0000% | 100.0000% | 100.0000% |

All percentages are based on weight.
Tinuvin ® 123 = Product of Ciba ®, CAS # 129757-67-1; Tinuvin ® 1130 = Product of Ciba ® CAS # 104810-47-1
IRGASTAB ® KV10 = Product of Ciba ®, CAS # 110553-27-0.
geranyl acetone = 2,6-dimethyl-2,6-undecadien-10-one

EXAMPLES

Example 1

In a laboratory setting, a 130 foot-long, 1/0 concentric, 175 mil XLPE-insulated cable segment which had been in service was fitted with high-pressure terminal connectors of the type shown in FIG. 14 of Publication No. 2007/0169954 at each end thereof. The cable segment was injected with a dielectric enhancement fluid having the composition shown in Table 2.

TABLE 2

| Component | Formulation weight % |
|---|---|
| acetophenone | 15.00% |
| Tolylethylmethyldimethoxysilane | 53.00% |
| 2-cyanobutylmethyldimethoxy-silane | 12.00% |
| menthylanthranilate | 0.64% |
| octocrylene | 9.60% |
| avobenzone | 2.40% |
| ferrocene | 6.70% |
| TIPT | 0.66% |
| total | 100.00% |

At time zero (t=0 minutes), fluid flow was initiated at approximately 240 psig through the first terminal connector. Within 7 minutes, fluid had flowed through the entire length of the cable segment, at which point the outlet at the second terminal connector was plugged. The fluid injection rate dropped quickly, and was less than 1 ml/min. at t=21 min. Flow declined slowly to a level of 0.1 ml/min. until, at t=78 min., a DC voltage was applied across the conductor of the segment using an EX300 Inverter™, product of Miller Electric. The approximate values for current and voltage were 200 A and 9.8 V, respectively. The temperature of the terminal connector at the injection end increased from 17° C. at t=78 min. to a peak temperature of 36° C. at 104 min. Correspondingly, the flow rate increased from 0.1 to 10.8 ml/min. and the total fluid amount injected increased from 404 to 549 grams at t=78 and t=104 min., respectively. After the current flow was stopped at t=104 min. and the inlet flow was suspended at t=107 min., the injection side connector was sealed and the interstitial pressure as measured at the outflow end (i.e., the second terminal connector) increased from the 240 psig supply pressure to about 269 psig, before beginning to decay. In about a day, the pressure measured at the outflow end had decayed to less than the original supply pressure. Outside diameters (OD) of the insulation jacket adjacent to the first and second terminal connectors were measured with a laser micrometer before and after heating and confirmed that OD deflections caused by the temperature increases were reversible.

In the above experiment, some increase in flow rate from the reduction in viscosity was expected. However, the 19° C. temperature increase observed above should have resulted in a viscosity decrease of about 30% for the fluid used and a corresponding flow rate increase of about 30%. Surprisingly, the observed flow rate increases by about 100%. Furthermore, the calculated increase of the interstitial void volume due to thermal expansion corresponding to the above temperature increment at best can only account for less than about 5% of the flow increase. Again, the unexpected high flow rate and high total fluid volume injected as a result of heating the cable segment cannot be explained by interstitial geometry changes since any increase of the interstitial void volume is more than offset by increase in the specific volume of the fluid for the given temperature change.

Example 2

A 484 foot-long (147.5 meters) No. 2 AWG, round concentric, 220 mil XLPE-insulated cable segment was fitted with high-pressure injection connectors at each end and then injected in the field with formulation 4 of Table 1 in a manner similar to that describe in Example 1, above. The injection feed was started through a first injection adapter (t=0 minutes) at a pressure of 330 psig, at which point the cable temperature was about 14° C. The injection feed rate dropped quickly, and was to a level of 4.6 cc/minute at time t=27 minutes. At time t=29 minutes, a current of 153 A at 30 VDC was imposed to heat the segment. At time t=34 minutes the injection feed rate had increased 78% to 8.2 cc/min. The cable temperature measured on the external surface of the insulation several inches away from the injection connector was 21° C., representing a 7 degree rise. The temperature of the conductor had an estimated temperature rise of about 10° C. Fluid reached the connector at the opposite end at t=62 min.

That which is claimed:

1. A method for enhancing the dielectric properties of an electrical cable section having a central stranded conductor with an interstitial void volume, the conductor being encased in a polymeric insulation jacket with an elastic limit, the cable section having a first closable high-pressure connector attached at one end thereof and a second closable high-pressure connector attached at the other end thereof, each of the first and second connectors providing fluid communication to the void volume, the method comprising:

(a) opening both the first and second connectors and introducing a first quantity of at least one dielectric property-enhancing fluid via the first connector sufficient to substantially fill the interstitial void volume during a first time;
(b) closing the second connector and introducing an additional second quantity of the dielectric property-enhancing fluid via the first connector at a pressure greater than about 50 psig, but less than the elastic limit of the polymeric insulation jacket, during a second time;
(c) closing the first connector with the second connector remaining closed to confine the first and second quantities of the dielectric property-enhancing fluid within the void volume at a residual pressure greater than about 50 psig, but below the elastic limit; and
(d) heating the cable section by imposing a potential of no more than about 500 volts across a portion of the conductor between the ends of the cable during at least a portion of the first and second times.

2. The method according to claim 1, wherein the conductor of the cable section is smaller than 4/0.

3. The method according to claim 1, wherein the cable section is heated only during step (b).

4. The method according to claim 1, wherein the cable section is heated only during step (a).

5. The method according to claim 4, wherein the cable section is smaller than 4/0.

6. The method according to claim 1, wherein the residual pressure is between about 100 psig and about 1000 psig.

7. The method according to claim 6, wherein the residual pressure is between about 200 psig and about 400 psig.

8. The method according to claim 1, wherein the conductor is heated to a temperature range of 10 to 40° C. above ambient temperature.

9. The method according to claim 1, wherein the dielectric property-enhancing fluid comprises at least one aromatic organoalkoxysilane.

10. The method according to claim 9, wherein the dielectric property-enhancing fluid further comprises a condensation catalyst.

11. The method according to claim 10, wherein the dielectric property-enhancing fluid further comprises at least one component selected from isolauryl alcohol, acetophenone, 2-cyanobutylmethydimethoxysilane, geranylacetone, ferrocene, a compound having CAS # 129757-67-1, a compound having CAS # 104810-47-1, or a compound having CAS # 110553-27-0.

12. The method according to claim 11, wherein the aromatic alkoxysilane is tolylethylmethyldimethyloxysilane and the condensation catalyst is selected from methanesulfonic acid, dodecylbenzenesulfonic acid, trifluoromethanesulfonic acid, or benzenesulfonic acid.

13. The method according to claim 12, wherein the residual pressure is between about 200 psig and about 400 psig.

14. The method according to claim 1, wherein the dielectric property-enhancing fluid is a mixture of: (a) at least one anti-treeing agent; and (b) a water-reactive compound having a diffusion coefficient of greater than $10^{-7} cm^2/second$ at 50° C. in the polymeric insulation jacket, the mixture having an initial viscosity of ≤100 cP at 25° C., wherein the components (a) and (b) are different.

15. The method according to claim 14, wherein the anti-treeing agent is at least one compound selected from phenylmethyldimethoxysilane, phenyltrimethoxysilane, diphenyldimethoxysilane, or phenylmethyldiethoxysilane, and the water-reactive compound is selected from trimethylmethoxysilane or dimethyldimethoxysilane.

16. A method for enhancing the dielectric properties of an electrical cable section having a central stranded conductor with an interstitial void volume, the conductor being encased in a polymeric insulation jacket with an elastic limit, the cable section having a first closable high-pressure connector attached at one end thereof and a second closable high-pressure connector attached at the other end thereof, each of the first and second connectors providing fluid communication to the void volume, the method comprising:
(a) opening both the first and second connectors and introducing a first quantity of at least one dielectric property-enhancing fluid via the first connector sufficient to substantially fill the interstitial void volume during a first time;
(b) closing the second connector and introducing an additional second quantity of the dielectric property-enhancing fluid via the first connector at a selected pressure less than the elastic limit of the polymeric insulation jacket during a second time;
(c) closing the first connector with the second connector remaining closed to confine the first and second quantities of the dielectric property-enhancing fluid within the void volume at the selected pressure; and
(d) heating the cable section by imposing a potential of no more than about 500 volts across a portion of the conductor between the ends of the cable to heat the dielectric property-enhancing fluid introduced into the interstitial void volume during at least a portion of the first and second times.

17. The method according to claim 16, wherein heating of the cable section occurs during at least a portion of the first time when the first quantity of the dielectric property-enhancing fluid is introduced into the interstitial void volume via the first connector.

18. The method according to claim 16, wherein heating of the cable section occurs during at least a portion of the second time when the second quantity of the dielectric property-enhancing fluid is introduced into the interstitial void volume via the first connector.

19. The method according to claim 16, wherein the conductor is heated to a temperature range of 10 to 40° C. above ambient temperature.

20. The method according to claim 16, wherein the selected pressure is below the elastic limit of the insulation jacket along the entire length of the cable section.

21. The method according to claim 16, wherein the dielectric property-enhancing fluid comprises at least one aromatic organoalkoxysilane.

22. The method according to claim 21, wherein the dielectric property-enhancing fluid further comprises a condensation catalyst.

23. The method according to claim 16, wherein the dielectric property-enhancing fluid is a mixture of: (a) at least one anti-treeing agent; and (b) a water-reactive compound having a diffusion coefficient of greater than $10^{-7} cm^2/second$ at 50° C. in the polymeric insulation jacket, the mixture having an initial viscosity of ≤100 cP at 25° C., wherein the components (a) and (b) are different.

24. The method according to claim 23, wherein the anti-treeing agent is at least one compound selected from phenylmethyldimethoxysilane, phenyltrimethoxysilane, diphenyldimethoxysilane, or phenylmethyldiethoxysilane, and the water-reactive compound is selected from trimethylmethoxysilane or dimethyldimethoxysilane.

25. A method for enhancing the dielectric properties of an electrical cable section having a central stranded conductor with an interstitial void volume, the conductor being encased in a polymeric insulation jacket with an elastic limit, the cable section having a first closable high-pressure connector attached at one end thereof and a second closable high-pressure connector attached at the other end thereof, each of the first and second connectors providing fluid communication to the void volume, the method comprising:

(a) opening both the first and second connectors and introducing a first quantity of at least one dielectric property-enhancing fluid via the first connector sufficient to substantially fill the interstitial void volume during a first time;

(b) closing the second connector and introducing an additional second quantity of the dielectric property-enhancing fluid via the first connector at a selected pressure less than the elastic limit of the polymeric insulation jacket during a second time;

(c) closing the first connector with the second connector remaining closed to confine the first and second quantities of the dielectric property-enhancing fluid within the void volume at the selected pressure; and (d) imposing an electrical potential across a portion of the conductor between the ends of the cable to heat the dielectric property-enhancing fluid introduced into the interstitial void volume during at least a portion of the first and second times, with the proviso that the polymeric insulation jacket temperature remains below about 90° C.

26. A method for enhancing the dielectric properties of an electrical cable section having a central stranded conductor with an interstitial void volume, the conductor being encased in a polymeric insulation jacket with an elastic limit, the cable section having a first closable high-pressure connector attached at one end thereof and a second closable high-pressure connector attached at the other end thereof, each of the first and second connectors providing fluid communication to the void volume, the method comprising:

(a) opening both the first and second connectors and introducing a first quantity of at least one dielectric property-enhancing fluid via the first connector sufficient to substantially fill the interstitial void volume during a first time;

(b) closing the second connector and introducing an additional second quantity of the dielectric property-enhancing fluid via the first connector at a selected pressure less than the elastic limit of the polymeric insulation jacket during a second time;

(c) closing the first connector with the second connector remaining closed to confine the first and second quantities of the dielectric property-enhancing fluid within the void volume at the selected pressure; and (d) imposing a potential across a portion of the conductor between the ends of the cable to heat the dielectric property-enhancing fluid introduced into the interstitial void volume during at least a portion of the first and second times, wherein the conductor temperature is increased about 10 to about 50° C. above the ambient temperature.

* * * * *